US008352577B2

(12) United States Patent
Martone (10) Patent No.: US 8,352,577 B2
(45) Date of Patent: Jan. 8, 2013

(54) METHOD AND APPARATUS FOR UPDATING INFORMATION ON AN EMBEDDED SYSTEM (75) Inventor: Terry Martone, Candor, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 246 days.

(21) Appl. No.: 12/177,538

(22) Filed: Jul. 22, 2008

(65) Prior Publication Data
US 2010/0023602 A1 Jan. 28, 2010

(51) Int. Cl.
G06F 15/177 (2006.01)
(52) U.S. Cl. ........... 709/220; 709/223; 701/2; 701/31.4; 717/171; 717/172; 717/173
(58) Field of Classification Search .................. 709/220, 709/223; 717/171–173; 701/2, 31.4
See application file for complete search history.

(56) References Cited

U.S. PATENT DOCUMENTS

| 4,943,919 | A | | 7/1990 | Aslin et al. |
| 5,023,791 | A | * | 6/1991 | Herzberg et al. ............... 701/35 |
| 5,270,931 | A | | 12/1993 | Appleford |
| 5,848,367 | A | * | 12/1998 | Lotocky et al. ................. 701/36 |
| 5,948,104 | A | * | 9/1999 | Gluck et al. .................... 726/24 |
| 6,438,468 | B1 | * | 8/2002 | Muxlow et al. .................. 701/3 |
| 6,671,589 | B2 | * | 12/2003 | Holst et al. ........................ 701/3 |
| 6,816,728 | B2 | | 11/2004 | Igloi et al. |
| 6,925,088 | B1 | * | 8/2005 | Moreaux ....................... 370/407 |
| 7,103,456 | B2 | | 9/2006 | Bloch et al. |
| 7,149,612 | B2 | * | 12/2006 | Stefani et al. ................... 701/35 |
| 7,213,268 | B2 | | 5/2007 | Stelling et al. |
| 7,290,258 | B2 | * | 10/2007 | Steeb et al. .................... 717/178 |
| 7,698,025 | B1 | * | 4/2010 | Cornell et al. .................... 701/3 |
| 7,735,058 | B2 | * | 6/2010 | Kinsella et al. .............. 717/106 |
| 2002/0011950 | A1 | | 1/2002 | Frazier et al. |
| 2002/0111720 | A1 | * | 8/2002 | Holst et al. ........................ 701/3 |
| 2003/0069015 | A1 | | 4/2003 | Brinkley et al. |
| 2003/0085621 | A1 | * | 5/2003 | Potega ............................ 307/18 |
| 2003/0158963 | A1 | * | 8/2003 | Sturdy et al. .................. 709/238 |
| 2003/0182404 | A1 | | 9/2003 | Saint-Etienne et al. |
| 2003/0203734 | A1 | * | 10/2003 | Igloi et al. ..................... 455/431 |
| 2003/0220987 | A1 | * | 11/2003 | Pearson ........................ 709/220 |
| 2005/0026609 | A1 | * | 2/2005 | Brinkley et al. .............. 455/431 |

(Continued)

OTHER PUBLICATIONS

ARINC 615A Ethernet Data Loading Software, Teledye Controls, pirnted Jun. 22, 2010.*

(Continued)

Primary Examiner — Alina N. Boutah
(74) Attorney, Agent, or Firm — Wolf, Greenfield & Sacks, P.C.

(57) ABSTRACT

A target system is dynamically configured to boot from a network connection upon power-up. A portable data loader connected to the target system may receive communications from the target system that a connection has been established. In response, a copy of a target-specific software data loader (SWDL) application may be transmitted from the portable data loader to the target system. The copy of the SWDL application may be stored in volatile memory on the target system and may be executed to support at least one maintenance operation. A user may invoke a maintenance operation by entering a command into the portable data loader. By isolating the data loader application from the operational software stored on the target system, the disclosed methods and apparatus may allow for reduced development and software certification costs for implementing maintenance operations on an embedded system.

22 Claims, 3 Drawing Sheets

U.S. PATENT DOCUMENTS

| | | | |
|---|---|---|---|
| 2005/0149238 A1* | 7/2005 | Stefani et al. | 701/33 |
| 2005/0187677 A1* | 8/2005 | Walker | 701/16 |
| 2005/0267860 A1* | 12/2005 | Benguigui | 707/1 |
| 2006/0005055 A1* | 1/2006 | Potega | 713/300 |
| 2006/0174221 A1 | 8/2006 | Kinsella et al. | |
| 2007/0027589 A1* | 2/2007 | Brinkley et al. | 701/3 |
| 2007/0055416 A1 | 3/2007 | Allen | |
| 2007/0115938 A1* | 5/2007 | Conzachi et al. | 370/352 |
| 2007/0130281 A1* | 6/2007 | Sandell et al. | 709/216 |
| 2007/0130437 A1* | 6/2007 | Larson et al. | 711/165 |
| 2007/0130599 A1* | 6/2007 | Monroe | 725/105 |
| 2007/0198143 A1* | 8/2007 | Ybarra et al. | 701/9 |
| 2007/0198513 A1* | 8/2007 | Stelling et al. | 707/6 |
| 2008/0070517 A1* | 3/2008 | Brady et al. | 455/98 |
| 2008/0091792 A1* | 4/2008 | Mei et al. | 709/217 |
| 2008/0174472 A1* | 7/2008 | Stone et al. | 342/30 |
| 2008/0209195 A1* | 8/2008 | Gobbo et al. | 713/1 |
| 2009/0077265 A1* | 3/2009 | Brinkley et al. | 709/249 |
| 2009/0133101 A1* | 5/2009 | Saint-Etienne | 726/3 |
| 2009/0138872 A1* | 5/2009 | Fuchs et al. | 717/173 |
| 2009/0138874 A1* | 5/2009 | Beck et al. | 717/173 |
| 2009/0192659 A1* | 7/2009 | Beebe et al. | 701/2 |
| 2009/0198712 A1* | 8/2009 | Sims et al. | 707/100 |
| 2010/0131149 A1* | 5/2010 | Saugnac et al. | 701/33 |
| 2011/0176617 A1* | 7/2011 | Fagan et al. | 375/259 |

OTHER PUBLICATIONS

NetLoader ARINC 615A Ethernet Data Loader Data Sheet, printed Jun. 22, 2010.*

* cited by examiner

METHOD AND APPARATUS FOR UPDATING INFORMATION ON AN EMBEDDED SYSTEM

TECHNICAL FIELD

The invention relates to the maintenance and updating of software and/or data on an embedded system.

BACKGROUND

Embedded systems are ubiquitously employed in electronic and electromechanical devices to provide one or a few specific functionalities. For example, military and commercial aircraft frequently utilize advanced avionics containing embedded systems such as inertial guidance systems, mission computers, GPS receivers, displays, etc. Each of these target embedded systems may have integrated operational software executing thereon to provide the desired specific functionalities for which the target system was designed. If the operational software is executing on a safety critical target system, such as an automatic flight guidance system, the software must be certified to ensure that operation of the target system meets rigorous legally-mandated safety standards.

As new software is developed or new data becomes available, the integrated operational software loaded on a target system may be updated to provide additional functionality afforded by the new software and/or data. This is typically accomplished by using a set of maintenance features embodied as a target-resident loader application built into the target system (e.g., residing in non-volatile memory on the system), such that execution of these maintenance features allows for software updates to proceed.

In some instances, the BIOS/OS of a target system may be modified to provide dual-boot capabilities to the system so that the target may optionally boot into a standard mode in which its operation software normally operates or a "maintenance" mode in which updates to the software may be performed by a target-resident loader application. Alternatively, maintenance functionality may be directly integrated into the operational software such that updated software and/or data may be provided to the target system when indicated through a user interaction with the target system. Regardless of the method used to provide the software data loader application to the target system, processes associated with the data loader application must be subjected to the same rigorous safety standards as the operational software itself, due to the software data loader application and the operational software being co-resident in non-volatile memory on the target hardware. Without such safety verification, the impact of the software data loader application on the execution of the safety critical operational software is unknown, and therefore not acceptable.

SUMMARY

Some embodiments are directed to a method of using an external maintenance device to update a target system configured to boot over a network. The method comprises receiving at the external maintenance device via at least one network protocol, communication from the target system that the external maintenance device is electrically connected to the target system, and sending, in response to the communication, a target-specific application from the external maintenance device to the target system.

Some embodiments are directed to a method of updating a target system. The method comprises receiving electrical information at the target system, the electrical information dynamically configuring the target system to boot over a network, supplying power to the target system, thereby establishing communication with a portable data loader connected to the target system, receiving at the target system, in response to the establishing communication with the portable data loader, a target-specific application from the portable data loader, and storing the target-specific application in a volatile memory on the target system.

Some embodiments are directed to a software maintenance system. The software maintenance system comprises a target system comprising a first non-volatile memory, a volatile memory, at least one processor, and a first network interface, a portable data loader comprising a second non-volatile memory storing at least one target-specific application, and a second network interface, and a maintenance cable connected between the first network interface and the second network interface, configured to facilitate a transfer of information between the portable data loader and the target system.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The accompanying drawings are not intended to be drawn to scale. In the drawings, each identical or nearly identical component that is illustrated in various figures is represented by a like reference character. For purposes of clarity, not every component may be labeled in every drawing. In the drawings.

DETAILED DESCRIPTION

The present disclosure generally relates to inventive methods and apparatus for providing a target system with a software data loader application. In order to update operational software and/or data on the target system, a target-resident data loader application may need to be executing on the target system. Commands sent to the data loader application may perform maintenance operations on the target system, thereby altering the target system's functionality.

Applicants have recognized and appreciated that conventional methods of integrating a software data loader application with an embedded target system may be improved by isolating the operational program from the data loader application on the target hardware. Various embodiments disclosed herein describe methods and apparatus for providing a stand-alone software data loader application to the target system over a networked interface. In at least one embodiment, a software data loader application may be provided to the target system over a networked connection and may be stored in and executed from a volatile memory (e.g., RAM) on the target system while at least one maintenance operation is performed. This approach may provide several benefits over existing data loader maintenance systems. For example, the pre-existing hardware and operational software residing on the target system may not need to be modified to incorporate maintenance features. Additionally, because the data loader application provided over the networked connection is not co-resident with operational software in non-volatile memory, processes associated with the data loader application may not have to be safety certified, as it can be assured that maintenance operations performed using the software data loader application stored in volatile memory will not impact the normal operation of the safety-critical operational software stored in non-volatile memory on the target system.

Figure 1:
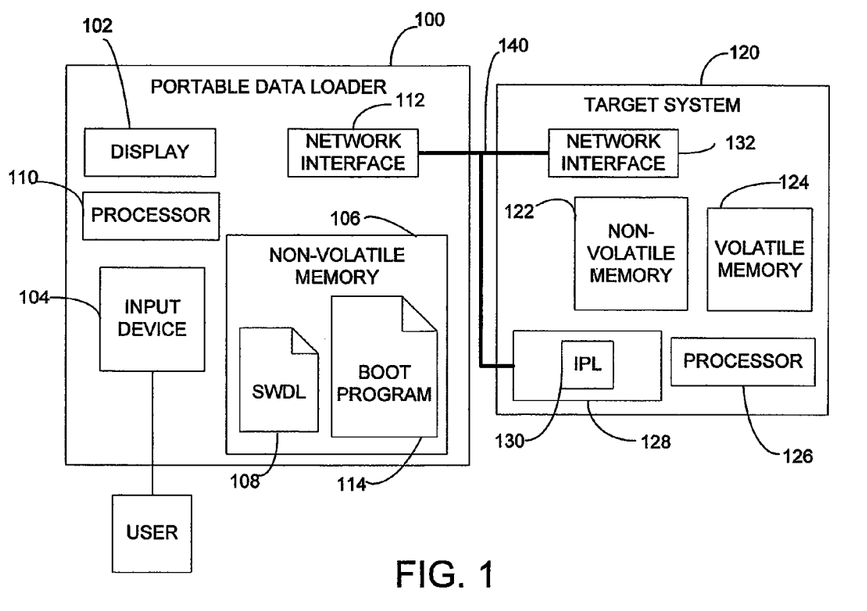
FIG. 1 is an illustration of a software maintenance system according to at least one embodiment of the invention.

In accordance with at least one embodiment, a target-specific software data loader application 108 may be stored on an external maintenance device 100 connectable to a target system 120 via a maintenance cable 140 as shown in FIG. 1. The maintenance cable 140 may be an Ethernet connection or any other suitable wired connection enabling communication between the external maintenance device 100 and the target system 120. When initially connected to the target system, the maintenance cable 140 may provide at least one discrete signal to the target system 120 to control a boot method of the target system.

Upon connection of the external maintenance device to the target system 120, a copy of the software data loader application 108 stored in non-volatile memory 106 on the external maintenance device 100 may be transferred to the target system 120. It should be appreciated that the transfer of the data loader application 108 from the external maintenance device 100 to the target system 120 may be automatic or manual, and embodiments of the invention are not limited in this respect.

In at least one embodiment, the external maintenance device 100 may be a portable data loader that communicates according to a standard protocol (e.g., ARINC-615A). One advantage of communicating via a standard protocol may be the increased flexibility of the system in that the portable data loader may be connected to and communicate with several different target systems that also communicate according to the standard. Thus, portable data loaders may store large quantities of maintenance information for updating many target systems according to the same standard protocol. Furthermore, updates may be performed by the same device in a more expedient manner if the communication required different protocols for each portable data loader and/or target system.

In at least one embodiment, in addition to the non-volatile memory 106 used for storing software data loader application 108 and/or any other applications or data, such as a boot program 114, the portable data loader may comprise a display 102 for displaying information to a user, such as an indication of which target system the portable data loader is connected to or any other suitable information. The portable data loader may additionally comprise at least one input device 104 including, but not limited to, buttons, switches, sliders, dials, or the like, for providing control information to the portable data loader. Control information may comprise, for example, instructions to invoke the download of operational software updates from the portable data loader to a target system. The portable data loader may also comprise a processor 110 for interpreting and/or executing instructions received from input device 104 and/or network interface 112. Network interface 112 may be configured to communicate using at least one network protocol. For example, network interface 112 may send and receive data packets using a file transfer protocol (FTP). In at least one embodiment, network interface 112 may be configured to use the trivial file transfer protocol (TFTP) to communicate with a target system via maintenance cable 140. The network interface 112 may however be configured to use any suitable protocol and embodiments of the invention are not limited in this respect. It should be appreciated that all components shown in FIG. 1 as part of portable data loader 100, such as display 102 and/or input device 104 may not be necessary for proper functioning of the portable data loader according to some embodiments of the invention and various modifications, additions, or deletions to the components of portable data loader are also contemplated.

As shown in FIG. 1, the portable data loader 100 may be connected to a target system 120 using maintenance cable 140. An exemplary target system 120 in accordance with some embodiments of the invention may comprise a non-volatile memory 122, a volatile memory 124, and a processor 126. The target system may additionally comprise a network interface 132 for communicating with one or more external devices over a wired network, and a hardware module 128 comprising an initial program loader (IPL) module 130. The hardware module 128 may comprise an integrated circuit or discrete components in the target system 120 which may include various electronic circuitries to support the operation of the target system 120.

In some embodiments, IPL module 130 may comprise one or more discrete components which may be configured to boot the target system 120 using a network connection rather than using an internal boot sequence stored in, for example, non-volatile memory 122 of the target system 120. For example, upon power-up of the target system 120, the processor 126 may query the IPL module 130 about where to find boot commands, and the IPL module 130 may be configured to instruct the processor that the boot commands may be accessed using network interface 132.

In some embodiments, the configuration of the IPL module 130 may occur as a result of receiving electrical information from the maintenance cable 140. For example, a connection of the maintenance cable 140 to the target system 120 may short open collector target system input signals (IPL discretes) to ground, thereby changing a logical value of the IPL discretes provided by the IPL module 130. In some embodiments, this may be accomplished by providing a ground path between a ground circuitry output from the target system and the IPL discrete inputs via internal ground jumpers in the maintenance cable. That is, the maintenance cable 140 may electrically connect a ground output of the target system to IPL discrete signal inputs.

By modifying the logical value of the IPL discretes, the target system 120 may be dynamically configured to boot over a network upon supplying power to the target system 120. Alternatively, when maintenance cable 140 is not connected to the target system 120, the logical value of the IPL discretes may remain unchanged, and the target system may boot using boot commands stored within a memory of the target system 120.

Figure 2:
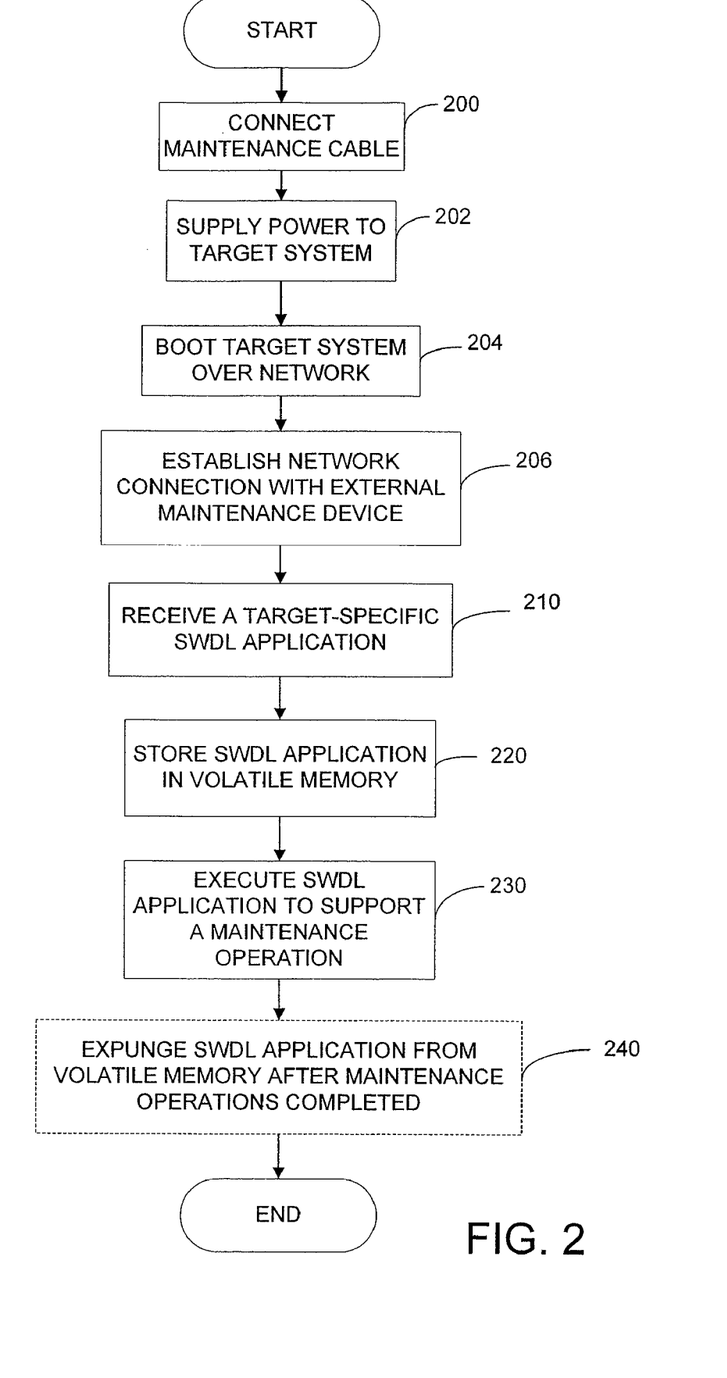
FIG. 2 is a flow chart of a process for receiving a software data loader application at a target system according to at least one embodiment of the invention.

In some embodiments, a target system connected to an external maintenance device, such a portable data loader may receive a software data loader application from the portable data loader over a network connection in accordance with a process having acts as illustrated in FIG. 2. In act 200, a maintenance cable may be connected to the target system. The connection of the maintenance cable to the target system may dynamically configure the target system to boot via a network connection upon supplying power to the target system, as described above. In act 202, power may be supplied to the target system thereby triggering the target processor to search for a boot sequence. The IPL module may be consulted for this purpose, and the IPL module when configured to do so, may instruct the processor that the desired boot commands may be accessed by booting using the network interface of the target system in act 204. For example, a Basic Input/Output System (BIOS) in the target system may read the logical value of IPL discretes provided by the IPL module, and determine based on the read logical value, whether or not to boot the target system using the network interface. In some embodiments, the logical value of IPL discrete signals may be modified by connecting a maintenance cable to the target system resulting in ground circuitry in the target system being electrically connected to the IPL discrete signals. For example, by shorting the IPL discretes to ground, the resulting logical value read by the BIOS may be changed from zero to one, resulting in the processor attempting to access boot commands via the network interface.

Connection information may then be sent via the target network interface to the network interface of the portable data loader via the maintenance cable to establish a connection between the two devices in act 206. The connection information may include an identifier of the target system and/or any other suitable information to enable the portable data loader to effectively communicate with the target system using the maintenance cable. Upon receiving the connection information, a boot program residing in the non-volatile memory of the portable data loader may be executed so as to establish a networked connection between the portable data loader and the target system using at least one network protocol. In at least one embodiment, the network protocol may be the trivial file transfer protocol (TFTP) or any other suitable network protocol for transferring data between the portable data loader and the target system.

After establishing file transfer capabilities between the portable data loader and the target system, the target system may receive a target-specific software data loader (SWDL) application via the maintenance cable in act 210 using the chosen network protocol. For example, the SWDL application may be a file stored on the portable data loader that is transferred to the target system using the TFTP protocol. Once the SWDL application is received by the target system, it may be stored in volatile memory on the target system in act 220. The volatile memory may be random access memory (RAM) such as dynamic random access memory (DRAM), static random access memory (SRAM), synchronous dynamic random access memory (SDRAM), or any other type of volatile memory. By temporarily storing the SWDL application in volatile memory, it can be assured that the presence of the SWDL will in no way adversely affect the normal functioning of the operational software of the target device when the target system is rebooted into normal operation mode. The SWDL application may then be executed to configure the target system to be able to support maintenance operations invoked by the portable data loader in act 230. After completion of the maintenance operations, the SWDL application may be expunged from the volatile memory in any known manner in act 240. Alternatively, the SWDL may not be expunged from volatile memory, but may merely be removed from volatile memory on power down of the target system (or upon re-initialization of the volatile memory upon the next power-up cycle).

Figure 3:
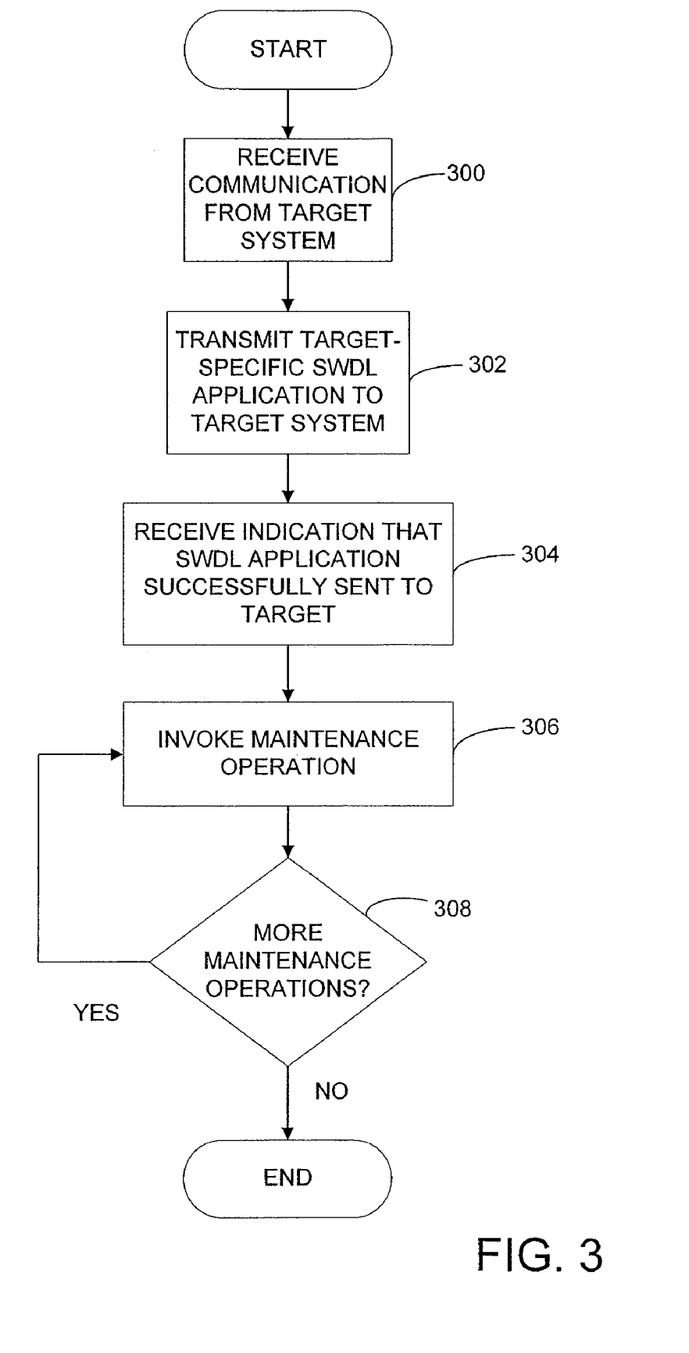
FIG. 3 is a flow chart of a process for transmitting information to a target system according to at least one embodiment of the invention.

According to at least one embodiment, the portable data loader may store at least one stand-alone SWDL application to transmit to a target system. The SWDL application may be transmitted to and implemented on the target system according to a method as illustrated in FIG. 3. In act 300, the portable data loader may receive a communication from the target system via the maintenance cable that the target system has power and is looking for boot commands. In response to this communication, a boot program stored in the non-volatile memory of the portable data loader may execute thereby establishing a file transfer protocol to transmit information between the portable data loader and the target system to establish a connection between the two devices. In at least one embodiment, the file transfer protocol used may be TFTP, although it should be appreciated that any suitable protocol may be used.

After establishing communication with the target system, software executing on the processor in the portable data loader may initiate transmission of a copy of an SWDL application (e.g., an executable file image) from the portable data loader to the target system via the maintenance cable in act 302. In at least one embodiment, the SWDL application may be transmitted using the selected file transfer protocol (e.g., TFTP). The SWDL application may be a file, such as an executable file, stored in non-volatile memory on the portable data loader, and an image of the SWDL application file may be transmitted from the portable data loader to the target system. After the SWDL application has been transmitted to the target system, the portable data loader may await an indication that the SWDL application has been successfully received and configured on the target system in act 304, so that a user may begin sending maintenance operation commands from the portable data loader to the target system in act 306. In act 306, a user may invoke one or more maintenance operations by activating one or more input devices on the portable data loader. For example, a list of possible maintenance operations may appear on the display of the portable data loader, and the user may select which maintenance operations to perform. Alternatively, the user may invoke all possible maintenance operations to be performed by activating one or more input devices (e.g., by pushing a button) on the portable data loader. It should be appreciated that the selection and/or invocation of various maintenance operations on the portable data loader may be performed in any suitable manner and embodiments of the invention are not limited in this respect.

In at least one embodiment, maintenance operations may include downloading updated operational software to the target system. The updated operational software may have additional functionality relative to the operational software previously installed on the target system. After transmitting the updated operational software to the target system, the updated operational software may be immediately installed on the target system, or the updated software may be written to non-volatile memory on the target system, and a flag or other suitable indication may be set so that the updated software may be installed upon the next boot of the target system into normal operation mode. It should be appreciated that the updated software may be installed in any suitable manner and embodiments of the invention are not limited in this respect.

Instead of, or in addition to downloading updated operational software during a maintenance operation, other maintenance operations may include downloading data from the portable data loader to the target system. The downloaded data may be used by the target system for a variety of purposes, and embodiments of the invention are not limited in this respect. For example, the downloaded data may be used to update calibration procedures, or improve the performance of the device in some way.

In at least one embodiment, maintenance operations may include requesting configuration information from the target system. For example, before updating the operational software of the target system, the portable data loader may first need to determine which version of the operational software is currently installed on the target system. To determine this, the portable data loader may query the target system for configuration information specifying the version of the operational software presently stored thereon, and in response to the query, the target system may provide the configuration information to the portable data loader. In some embodiments where the portable data loader has a display, the configuration information may be displayed on the display of the portable data loader, and a user may then invoke other maintenance operations based at least in part on the received configuration information. It should be appreciated that configuration information may include any suitable information about the configuration of the target system and not just the version of software stored on the target system. For example, configuration information may additionally comprise information about any hardware and/or software configurations of the target system.

In at least one embodiment, after a maintenance operation has been performed, a portable data loader may query a about any further maintenance operations to be performed in act 308. If other maintenance operations are to be performed, they may be invoked as described above, and the process may continue until there are no more maintenance operations to be performed, and the process ends. Once all desired maintenance operations are performed, the portable data loader may be disconnected from the target system and in some instances, may be used to update other target systems.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of using an external maintenance device to update a target system configured to boot over a network, the method comprising:
   receiving at the external maintenance device via at least one network protocol, communication from the target system that the external maintenance device is electrically connected to the target system; and
   sending, in response to the communication, a target-specific application from the external maintenance device to the target system, wherein the target-specific application is an executable stand-alone application isolated from operational software on the target system that, when executed from a volatile memory on the target system, enables the external maintenance device to perform at least one maintenance operation on the target system, wherein the at least one maintenance operation comprises sending at least one command from the external maintenance device to the target-specific application.

2. The method of claim 1, wherein external maintenance device is a portable data loader.

3. The method of claim 1, wherein the at least one network protocol comprises a Trivial File Transfer Protocol (TFTP).

4. The method of claim 1, further comprising receiving an indication that the target-specific application was successfully sent to the target system, and in response to receiving the indication, performing the at least one maintenance operation.

5. The method of claim 4, wherein performing the at least one maintenance operation comprises downloading operational software from the external maintenance device to the target system.

6. The method of claim 4, wherein performing the at least one maintenance operation comprises sending a request for configuration information to the target system.

7. The method of claim 6, further comprising:
   receiving from the target system, in response to the request, the configuration information; and
   displaying on the external maintenance device the configuration information.

8. A method of updating a target system, the method comprising:
   receiving electrical information at the target system, the electrical information dynamically configuring the target system to boot over a network;
   supplying power to the target system, thereby establishing communication with a portable data loader connected to the target system;
   receiving at the target system, in response to the establishing communication with the portable data loader, a target-specific application from the portable data loader, wherein the target-specific application is an executable stand-alone application isolated from operational software on the target system that, when executed from a volatile memory on the target system, enables the portable data loader to perform at least one maintenance operation on the target system, wherein the at least one maintenance operation comprises sending at least one command from the portable data loader to the target-specific application; and
   storing the target-specific application in the volatile memory on the target system.

9. The method of claim 8, further comprising:
   executing the target-specific application in the volatile memory to support the at least one maintenance operation.

10. The method of claim 9, wherein the at least one maintenance operation comprises downloading operational software from the portable data loader to the target system.

11. The method of claim 10, wherein downloading operational software is initiated by executing at least one command on the portable data loader.

12. The method of claim 10, wherein the at least one maintenance operation comprises providing configuration information to the portable data loader in response to a request from the portable data loader to provide the configuration information.

13. The method of claim 9, further comprising:
   expunging the target-specific application from the volatile memory upon receiving an indication from the portable data loader that no further maintenance is required.

14. A software maintenance system, comprising:
   a target system comprising a first non-volatile memory, a volatile memory, at least one processor, and a first network interface;
   a portable data loader comprising a second network interface and a second non-volatile memory storing at least one target-specific application that, when executed by the target system, enables the portable data loader to perform at least one maintenance operation on the target system, wherein the target-specific application is an executable stand-alone application isolated from operational software on the target system, wherein the at least one maintenance operation comprises sending at least one command from the portable data loader to the target-specific application; and
   a maintenance cable connected between the first network interface and the second network interface, configured to facilitate a transfer of information between the portable data loader and the target system, wherein the information includes the target-specific application.

15. The software maintenance system of claim 14, wherein the volatile memory is a RAM.

16. The software maintenance system of claim 14, wherein the first non-volatile memory has at least one operational program stored thereon.

17. The software maintenance system of claim 14, wherein the maintenance cable comprises an Ethernet cable and the information comprises electrical information to control a target system boot method.

18. The software maintenance system of claim 17, wherein the target system further comprises at least one initial program loader (IPL) module configured by the electrical information to enable the target system to boot from a network upon supplying power to the target system.

19. The software maintenance system of claim 14, wherein the portable data loader further comprises a processor configured to communicate with the target system via the second network interface using at least one network protocol.

20. The software maintenance system of claim 14 wherein at least some of the information is transferred from the portable data loader to the target system in accordance with the ARINC-615A protocol.

21. The software maintenance system of claim 14, wherein the target system is incorporated in an aircraft vehicle.

22. The method of claim 1, wherein the target-specific application, when executed, enables the external maintenance device to perform the at least one maintenance operation on the target system in accordance with an ARINC protocol.

* * * * *